N. C. SIMONSEN.
ANIMAL RELEASING DEVICE.
APPLICATION FILED MAY 25, 1917. RENEWED OCT. 7, 1918.
1,295,622. Patented Feb. 25, 1919.
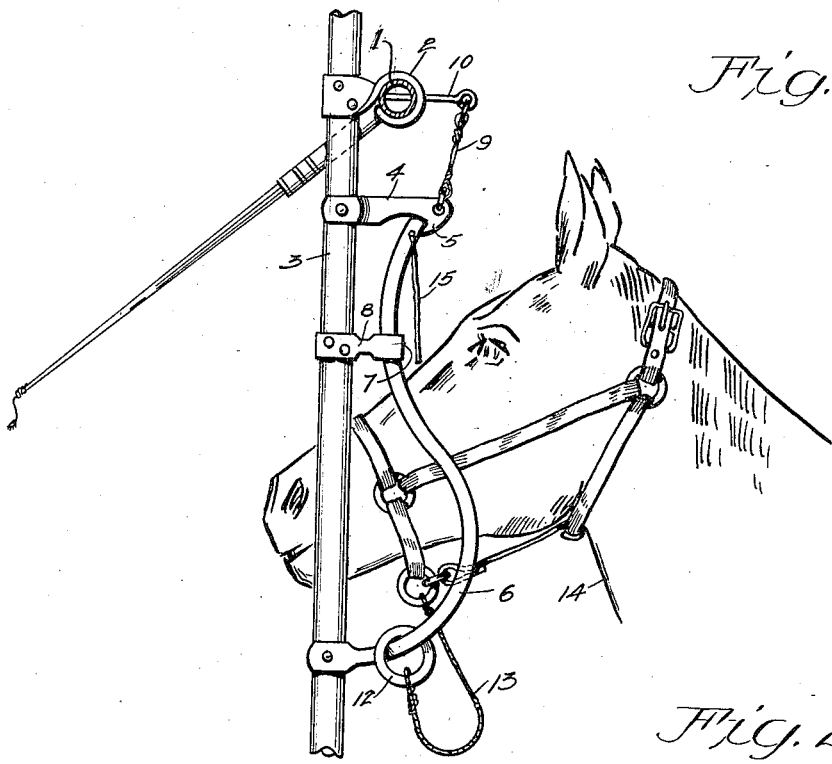
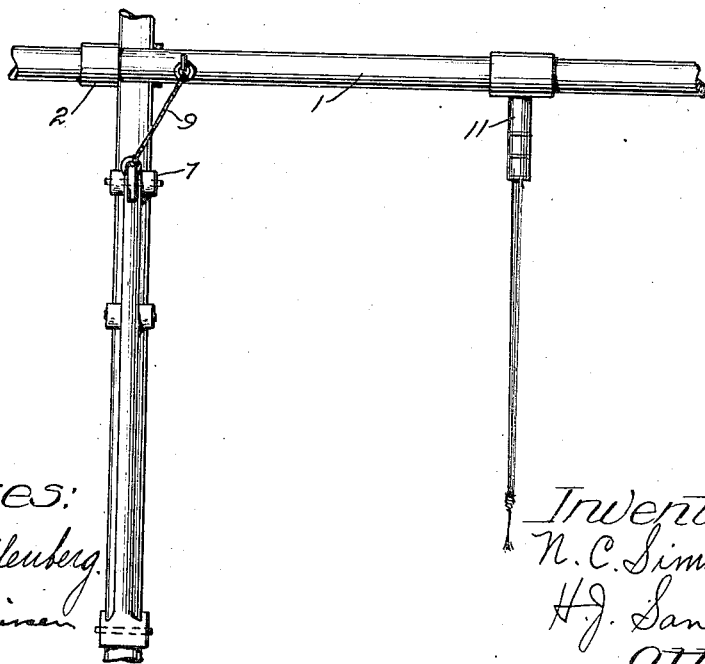

UNITED STATES PATENT OFFICE.

NIELS CHRISTIAN SIMONSEN, OF LAURIN, MONTANA.

ANIMAL-RELEASING DEVICE.

1,295,622.

Specification of Letters Patent. Patented Feb. 25, 1919.

Application filed May 25, 1917, Serial No. 170,887. Renewed October 7, 1918. Serial No. 257,315.

*To all whom it may concern:*

Be it known that I, NIELS CHRISTIAN SIMONSEN, a citizen of the United States, residing at Laurin, in the county of Madison and State of Montana, have invented certain new and useful Improvements in Animal-Releasing Devices, of which the following is a specification.

This invention relates to improvements in animal releasing devices and its object is to provide a device for normally holding a number of animals in a series of stalls in a stable, but which may be operated in time of necessity to simultaneously release said animals. A further object is to provide a device of this class that is simple in construction, cheap to manufacture and efficient in operation. With the foregoing and other objects in view the invention consists in the combination and arrangement of parts to be hereinafter fully described, pointed out in the appended claims and illustrated in the accompanying drawing which forms a part of this specification and in which—

Figure 1 is a side elevation, partly in section, of one embodiment of my invention illustrating its application.

Fig. 2 is a front elevation of the device.

Like reference characters denote corresponding parts in both views.

The reference numeral 1 denotes a rotary rod supported in brackets 2 secured to a plurality of upright posts or supports 3. Each support 3 below its bracket 2 is provided with a pivotally supported arm 4 formed with a downwardly extending heel 5 which is normally in frictional engagement with one end of a curved spring rod 6, the opposite end of said rod being connected to the said support 3, said arm being also engaged normally by the bifurcated end 7 of a guide arm 8 fixedly secured to said support 3 between arm 4 and the permanently secured end of said curved arm 6. The pivoted arm 4 at its non-pivoted end is connected by a cord 9 to a bar 10 fixedly secured to the said rotary rod 1. A suitable whip 11 fast to the said rod 1 is rotated by rotation of the same, said whip being secured to said rod 1 in the several stalls. The curved spring rod 6 is adapted to carry the usual hitching ring 12 introduced over one end of said rod 6, said ring 12 carrying the usual halter strap 13 provided for the animal 14.

The spring rod 6 is curved outwardly from the post 3 beyond the plane of the free end of the arm 4 to reduce the tension at the point of contact of said arm 6 with the heel 5 of arm 4. When the rod 1 is rotated in one direction the bars 10 and cords 9 raise the arms 4 of supports 3 and so free the ends of the curved spring rods 6 which rods, being under tension, then move into such position as to release the hitching rings 12 thus freeing the animals. The rotation of the rod 1 also causes the whip 11 to strike the animals in the several stalls and so drive them out. Each arm 6 is provided with a cord 15. The animals are only released simultaneously by the device in time of necessity, such as fire or the like as at other times the snap hook at the end of the halter strap is removed from the hitching ring in the ordinary manner. After the animals have been released simultaneously the device is reset by a person going into each stall and binding the free end of each curved rod 6 in raised or normal position by means of the cords 15 which are tied about the supports 3. The rod 1 is then moved into such position that the arms 4 may be individually placed in engagement with the several curved rods 6 when the strings 15 are untied or cut and the said rods 6 set in engagement with the said arms 4 again, the hitching rings 12, of course, having been previously placed again upon the said rods 6.

What is claimed is:—

1. In an animal releasing device, upright supporting rods, brackets carried by said supporting rods, a rotary rod journaled in said brackets, arms pivotally connected to said supporting rods below said brackets and terminating in heels, connection between said rotary rod and said heels, guide arms fast to said supporting rods below said pivoted arms, and curved spring rods pivotally connected to said supporting rods and normally engaging said guide arms and the heels of said pivoted arms.

2. In an animal releasing device, upright supporting rods, brackets carried by said supporting rods, a rotary rod journaled in said brackets, arms pivotally connected to said supporting rods below said brackets and terminating in heels, connection between said rotary rod and said heels, guide arms fast to said supporting rods below said pivoted arms, and curved spring rods pivotally connected to said supporting rods and bulged away from said supporting rods beyond the plane of the free ends of said pivoted arms and then bent back into engagement with said guide arms and the heels of said pivoted arms.

3. In an animal releasing device, upright supporting rods, brackets carried by said supporting rods, a rotary rod journaled in said brackets, whips carried by said rotary rod, arms pivotally connected to said supporting rods below said brackets and terminating in heels, connection between said rotary rod and said heels, guide arms fast to said supporting rods below said pivoted arms, curved spring rods pivotally connected to said supporting rods and normally engaging said guide arms and the heels of said pivoted arms, and cords carried by said curved spring rods.

In testimony that I claim the foregoing as my own I have hereto affixed my signature in the presence of two subscribing witnesses.

NIELS CHRISTIAN SIMONSEN.

Witnesses:
MARIUS RASMUSSEN,
P. O. JOHNSON.

Copies of this patent may be obtained for five cents each, by addressing the "Commissioner of Patents, Washington, D. C."